UNITED STATES PATENT OFFICE.

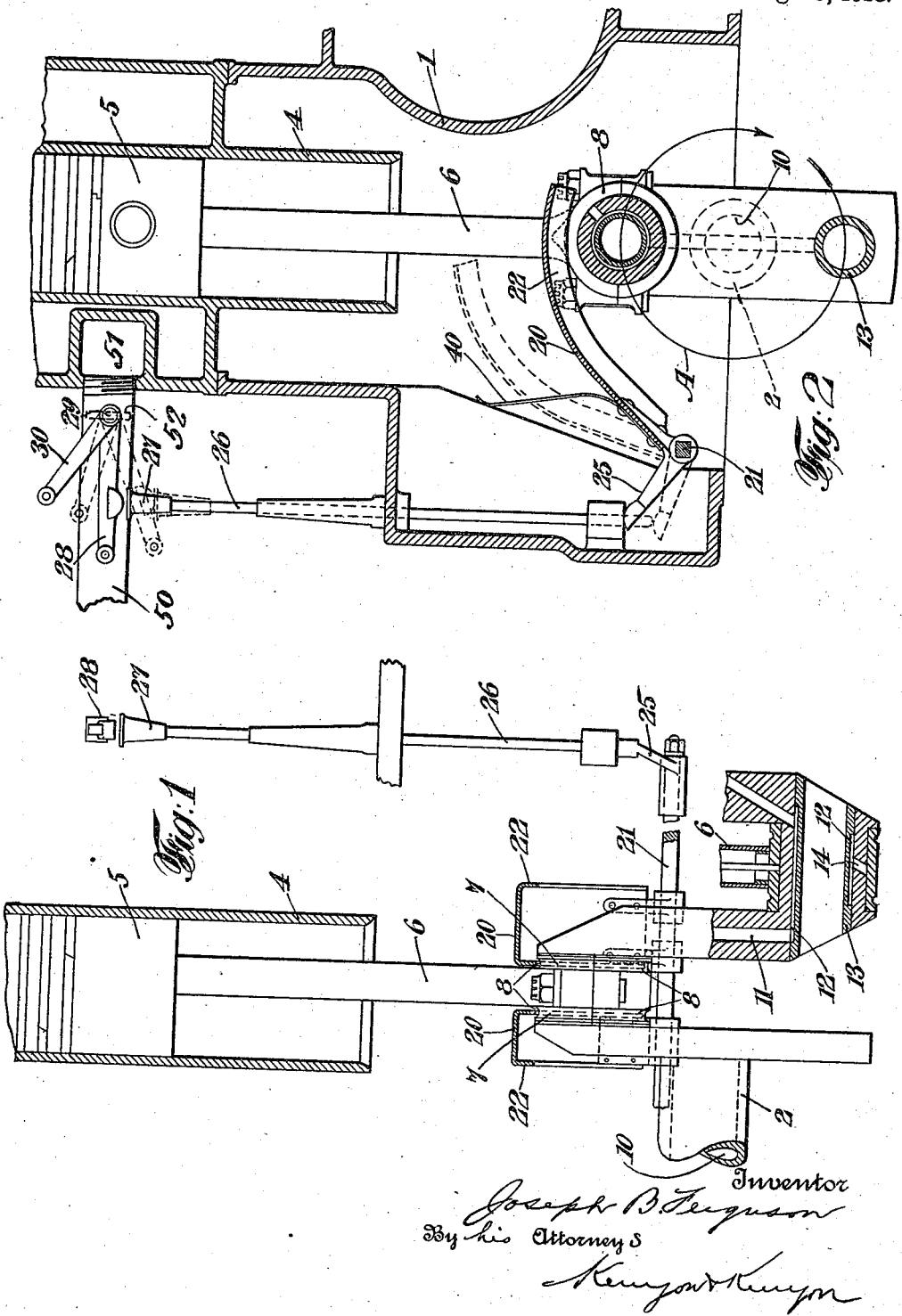

JOSEPH B. FERGUSON, OF NEW YORK, N. Y.

OILING SYSTEM.

1,275,236.　　　Specification of Letters Patent.　　Patented Aug. 13, 1918.

Application filed April 26, 1917. Serial No. 164,628.

*To all whom it may concern:*

Be it known that I, JOSEPH B. FERGUSON, a subject of the King of Great Britain, and a resident of New York, county of New York, State of New York, have invented certain new and useful Improvements in Oiling Systems, of which the following is a specification.

This invention relates to oiling systems especially applicable to engines wherein relatively moving contacting parts are lubricated by oil thrown against one of them by another moving part of the engine.

One object of this invention is to provide a system for an engine wherein the cylinder and piston are lubricated by oil thrown against the walls of the cylinder by a moving part of the engine, and further to provide means for controlling the amount of oil reaching the cylinder and piston.

A further object is to provide means for controlling the lubrication of a piston and cylinder which is dependent upon the amount of energy required from the engine.

For the purpose of disclosing my invention I show a preferred embodiment of my invention wherein the cylinder and piston of an internal combustion engine are lubricated by oil thrown toward them by the crank shaft, and the amount of oil reaching them is controlled by adjustable deflecting plates or baffles, the adjustment of which is dependent upon the setting of some part of the speed controlling or throttle mechanism.

Other and further objects and advantages will appear from the following description, taken in connection with the accompanying drawings forming part of this specification, and will be pointed out in the hereunto appended claims.

In the drawings, in which like reference characters indicate similar parts, Figure 1 is a partial longitudinal section of an engine embodying my invention, with parts broken away. Fig. 2 is a partial transverse sectional view of the engine shown in Fig. 1, with parts broken away.

For the purpose of disclosing my invention I shall describe a single-acting engine, preferably an internal combustion engine, which embodies my invention; but it is to be understood that I do not limit myself to the particular adaptation of my invention herein described, but intend that my invention shall be defined by the hereunto appended claims.

In the construction illustrated for the purpose of disclosing my invention, the engine comprises frame 1, in which is mounted the crank shaft 2, which is mounted to rotate in the direction of the arrow A. The usual cylinder 4 is mounted upon the frame 1, and there may be as many cylinders as desired. The piston 5 is positioned within the cylinder and is connected to the crank shaft by the usual connecting rod 6. The big-end of the connecting rod is provided with extensions 7 at the sides thereof, which provide elongations of the bearings for the crank pins of the crank shaft. These bearings are provided with grooves 8, the purpose of which will more fully hereinafter appear. It is customary to lubricate the piston and the cylinder by oil thrown upon these parts by the rotation of the crank shaft, and oil is supplied to the rotating crank shaft in many ways.

The means of supplying oil to the crank shaft, together with its bearings and the crank pin bearings, forms no part of this particular invention, but the oil may be supplied in many ways; for example, by providing beneath the crank shaft an oil pan into which the crank members of the shaft dip, or by providing a system such as is illustrated in the drawings. This system consists in forming an opening 10 in the crank shaft to which oil is fed. It is led through openings in the cranks to the crank pins, for example through the passage 11 to the passage 12 formed between the hollow pin 13 and the inner face of a bore through the crank pin. From the passage 12 it is led to the outer surface of the crank pin through a passage 14. It is very evident that the oil will seep out at the ends of the extensions 7 on the big end of the connecting rod, and will be thrown out by centrifugal force as the shaft rotates. Oil will also creep out along the crank members from the crank shaft bearing, and will be thrown from these crank members as the shaft rotates.

In high speed engines the centrifugal force throws so much oil out that an excessive amount is supplied to the cylinders, and in internal combustion engines objectionable carbonizing takes place. In order to regulate the amount of oil which reaches the cylinder after being thrown from the rotating shaft, I provide a series of deflecting plates or baffles 20, which may be mounted upon a square shaft 21 mounted in the frame 1 of the engine. The edges of these plates 20 are provided with downwardly extending flanges 22, which flanges are substantially in the plane of the grooves 8 in the outer surfaces of the bearings of the big end. Due to the rotation of the crank shaft the oil is thrown from the outer edges of the grooves 8, and therefore it strikes the under face of the plates 20, and the flanges 22 prevent it from being deflected on to the rotating parts, and the oil, on the contrary, flows down the plates back into the base of the engine. Springs 40 steady the plates.

The amount of oil thrown on the cylinder and piston is regulated by rotating shaft 21 so as to swing the plates 20 into and out of the line extending between the crank shaft and the cylinder. A crank 25 is attached to the shaft 21, and coöperating with this crank is a push rod 26, the top 27 of which is acted upon by a lever 28 which is connected to the shaft 29 which has on it a lever 30. The shaft 29, or the lever 30, is intended to be connected to some part of the mechanism which controls the speed of the engine or the amount of fuel or other source of energy supplied thereto; for example, the shaft 29 is shown as connected to the butterfly valve 52 in the intake pipe 50 which leads to the fuel mixture manifold or header 51. It will therefore be apparent, from the construction illustrated, that when certain amounts of energy are required from the engine, the baffle plates will have different positions in the space between the crank shaft and the cylinder, and different amounts of oil will be permitted to reach the cylinder in accordance with the needs of the engine.

It is apparent, therefore, that I have provided an engine in which there are two relatively moving parts in contact, such as a cylinder and its piston, and a third moving part such as a crank shaft adapted to throw oil toward the contacting parts, and I have provided means such as a deflector and controlling means for controlling the amount of oil reaching the two contacting parts, which means is capable of various modifications, developments, and adaptations within the scope of the appended claims, and its adjustment may be dependent upon the setting of the controlling mechanism of the engine.

What I claim as new and desire to secure by Letters Patent, is:

1. In an engine, a cylinder member, a piston member, a crank shaft member and connecting rod member, one of said last two members being arranged to throw oil toward one of said two first named members, and a deflector plate mounted for swinging in the path of said oil for controlling the amount of oil reaching said member toward which said oil is thrown.

2. In an engine the combination of two parts moving relatively to one another and in contact with each other, a third part of said engine moving relatively to one of said first parts, all of said parts being interconnected to cause said relative motion during the normal operation of the engine, a source of oil supply, said third part being arranged to throw oil from said supply toward one of said two first named parts and a deflector plate mounted for movement in the path of said oil thrown by said third part whereby the amount of oil reaching said part toward which the oil is thrown is controlled.

3. In an engine the combination of two parts moving relatively to one another and in contact with each other, a third part moving relatively to one of said first named parts, said parts being inter-connected to cause said relative motion thereof during normal operation of the engine, a source of oil supply, said third part being arranged to throw oil from said supply toward one of said first named parts to lubricate the contacting surfaces of said contacting parts, means for controlling said engine and means for controlling the amount of oil reaching said part toward which said oil is thrown, said oil controlling means being operatively connected to said engine controlling mechanism.

4. In an engine the combination of two parts moving relatively to one another and in contact with each other, a third part moving relatively to one of said contacting parts, said parts being inter-connected to cause said relative motion thereof during normal operation of said engine, a source of oil supply, said third part being arranged to receive oil from said supply and throw said oil toward one of said contacting parts to lubricate the contacting surfaces thereof, means for controlling said engine, comprising a movable part and a deflector plate mounted for movement in the path of the oil thrown toward said contacting parts and control the amount of said oil reaching the part toward which said oil is thrown, said deflector being moved by said engine controlling means.

5. In an engine, a cylinder member, a piston member, a crank shaft member and connecting rod member, one of said last two members being arranged to throw oil toward one of said members, and a deflecting plate mounted for swinging adjustment in the path of said oil.

6. In an engine a cylinder member, a piston member, a crank shaft member and connecting rod member, one of said last two members being arranged to throw oil toward one of said members, and a deflecting plate in the path of said oil, the bearing ends of said connecting rod member being provided with a flange whereby oil is carried to a point where it will be thrown in the direction of said deflector when thrown from said bearing end.

7. In an engine a cylinder member, a piston member, a crank shaft member and connecting rod member, one of said last two members being arranged to throw oil toward one of said members, and a deflecting plate in the path of said oil, the bearing ends of said connecting rod member having a circumferential groove, and said plate having a flange extending substantially in the plane of said groove.

8. In an engine a cylinder member, a piston member, a crank shaft member and connecting rod member, one of said last two members being arranged to throw oil toward one of said members, and a deflecting plate in the path of said oil, and having means to prevent oil thrown upon it from being deflected upon said members.

9. In an engine the combination of two parts moving relatively to one another and in contact with each other, a third part moving relatively to one of said contacting parts, all of said parts being inter-connected to cause relative motion thereof during normal operation of the engine, a source of oil supply, said third part being arranged to receive oil from said supply and throw it toward one of said contacting parts to lubricate the contacting surfaces of said parts, a deflector plate mounted for movement in the path of oil thrown by said third part to control the amount of oil reaching one of said contacting parts, said plate having a flange thereon whereby oil thrown against the plate is prevented from being deflected upon said parts.

10. In an engine, a cylinder member, a piston member, a crank shaft member and a connecting rod member, one of said last two members being arranged to throw oil toward one of said first named members, a deflector plate mounted for movement in the path of said oil to control the amount of oil reaching said member toward which the oil is thrown and means for controlling the deflector plate.

In testimony whereof, I have signed my name to this specification.

JOSEPH B. FERGUSON.

Copies of this patent may be obtained for five cents each, by addressing the "Commissioner of Patents, Washington, D. C."